US007524481B2

(12) United States Patent
Tenne et al.

(10) Patent No.: US 7,524,481 B2
(45) Date of Patent: Apr. 28, 2009

(54) REACTORS FOR PRODUCING INORGANIC FULLERENE-LIKE TUNGSTEN DISULFIDE HOLLOW NANOPARTICLES AND NANOTUBES

(75) Inventors: Reshef Tenne, Rehovot (IL); Yishay Feldman, Ashdod (IL); Alla Zak, Rehovot (IL); Rita Rosentsveig, Rehovot (IL)

(73) Assignee: Yeda Research and Development Co., Ltd., Rehovot (IL)

( * ) Notice: Subject to any disclaimer, the term of this patent is extended or adjusted under 35 U.S.C. 154(b) by 175 days.

(21) Appl. No.: 10/220,688

(22) PCT Filed: Mar. 6, 2001

(86) PCT No.: PCT/IL01/00211

§ 371 (c)(1),
(2), (4) Date: May 22, 2003

(87) PCT Pub. No.: WO01/66462

PCT Pub. Date: Sep. 13, 2001

(65) Prior Publication Data
US 2004/0105808 A1    Jun. 3, 2004

(30) Foreign Application Priority Data
Mar. 6, 2000    (IL)    .................... 134891

(51) Int. Cl.
*H01M 4/58*    (2006.01)
(52) U.S. Cl. ............ 423/561.1; 977/700; 427/255.28; 118/724; 118/723 VE; 422/143; 422/145; 422/146; 422/193; 422/199; 422/232; 422/240

(58) Field of Classification Search ............ 423/561.1; 977/DIG. 1; 427/255.28; 118/724, 723 VE; 422/143, 145, 146, 193, 199, 232, 240
See application file for complete search history.

(56) References Cited

U.S. PATENT DOCUMENTS
3,790,349 A    2/1974    Andreichev
(Continued)

FOREIGN PATENT DOCUMENTS
WO    WO 97/44278 A1    11/1997
(Continued)

OTHER PUBLICATIONS
Science Direct Abstract for Feldman, Y. et al., "New Reactor for Production of Tungsten Disulfide Hollow Onion-Like (Inorganic Fullerene-Like) Nanoparticles", Solid State Sciences, vol. 2, Issue 6, pp. 663-672, establishing publication date of Oct. 01, 2000.*
(Continued)

*Primary Examiner*—Steven Bos
*Assistant Examiner*—Paul Wartalowicz
(74) *Attorney, Agent, or Firm*—Browdy and Neimark, P.L.L.C.

(57) ABSTRACT

The present invention is related to an apparatus for the production of inorganic fullerene-like (IF) nanoparticles and nanotubes. The apparatus comprises a chemical reactor, and is further associated with a feeding set up and with a temperature control means for controlling the temperature along the reaction path inside the reactor so as to maintain the temperature to be substantially constant. The invention is further directed to a method for the synthesis of IF-WO3 nanoparticles having spherical shape and having a size up to 0.5 mu m and nanotubes having a length of up to several hundred mu m and a cross-sectional dimension of up to 200 nanometer.

13 Claims, 8 Drawing Sheets

U.S. PATENT DOCUMENTS

| | | | |
|---|---|---|---|
| 4,132,763 | A | 1/1979 | Schmidt et al. |
| 4,705,702 | A * | 11/1987 | Shimada et al. ............. 427/180 |
| 5,352,430 | A * | 10/1994 | McCulfor et al. ........... 423/448 |
| 5,413,773 | A * | 5/1995 | Tibbetts et al. ........... 423/447.3 |
| 5,472,477 | A * | 12/1995 | Konig ........................ 75/343 |
| 6,007,869 | A | 12/1999 | Schreieder et al. |
| 6,217,843 | B1 * | 4/2001 | Homyonfer et al. ...... 423/593.1 |
| 2004/0018306 | A1 * | 1/2004 | Tenne et al. ............ 427/255.28 |
| 2004/0105808 | A1 * | 6/2004 | Tenne et al. .............. 423/561.1 |

FOREIGN PATENT DOCUMENTS

| | | |
|---|---|---|
| WO | WO 98/23796 A1 | 6/1998 |
| WO | 0066485 A1 | 11/2001 |

OTHER PUBLICATIONS

European Patent Office, Patent Abstracts Of Japan: Abstract for JP 03261623, "Production Device of Uranium Hexafluoride", Mitsubishi Materials Corp (Nov. 21, 1991).

Y. Feldman et al., "New Reactor for Production of Tungsten Disulfide Hollow Onion-Like (Inorganic Fullerene-Like) Nanoparticles", *Solid State Sciences*, vol. 2, No. 4, pp. 663-672 (Jun. 1, 2000).

Magneli, "Some Aspect Of The Crystal Chemistry Of Oxygen Compounds Of Molybdenum And Tungsten Containing Structural Elements of $ReO_3$ or Perovskite Type", *J. Inorg. Nucl. Chem.*, vol. 2,. pp. 330-339 (1956).

Y. Feldman et al., "High-Rate, Gas-Phase Growth of $MoS_2$ Nested Inorganic Fullerences And Nanotubes", *Science*, vol. 267, pp. 222-225 (Jan. 13, 1995).

Y. Feldman et al., "Kinetics Of Nested Inorganic Fullerene-Like Nanoparticles Formation", *J. Am. Chem. Soc.*, vol. 120, pp. 4176-4183 (1998).

Tenne et al., "Synthesis And Properties Of Encapsulated And Intercalated Inorganic Fullerene-Like Structures", *Advanmces in Metal and Semiconductor Clusters*, vol. 4, pp. 227-252 (1998).

Tsirlina et al., "Sythesis And Characterization Of Inorganic Fullerene-Like $Wse_2$ Material", *Fullerene Science and Technology*, vol. 6(1), pp. 157-165 (1998).

Homyonfer et al., "Intercalation Of Inorganic Fullerene-Like Structures Yields Photosensitive Films And New Tips For Scanning Probe Microscopy", *J. Am. Chem. Soc.*, vol. 119, pp. 2693-2698 (1997).

Remskar et al., "$MoS_2$ Microtubes: An Electron Microscopy Study", *Surface Review and Letters*, vol. 5, No. 1, pp. 423-426 (1998).

Remskar eet al., "New Crystal Structures of $WS_2$: Microtubes, Ribbons, and Ropes", *Advanced Materials*, vol. 10, No. 3, pp. 246-249 (1998).

Vollath et al., "Synthesis of Nanocrystalline $MoS_2$ and $WS_2$ in a Microwave Plasma", *Material Letters*, vol. 35, pp. 236-244 (May 1998).

Zelenski et al., "Template Synthesis Of Near-Monodisperse Microscale Nanofibers And Nanotubes Of $MoS_2$", *J. Am. Chem. Soc.*, vol. 120, pp. 734-742 (1998).

Jose-Yacaman et al., "Studies of $MoS_2$ Structures Produced by Electron Irradiation", *Appl. Phys. Lett.*, vol. 69(8), pp. 1065-1067 (Aug. 19, 1996).

Parilla et al., "The First True Inorganic Fullerenes?", *Nature*, vol. 397, p. 114 (Jan. 14, 1999).

Homyonfer et al., "Scanning Tunneling Microscope Induced Crystallization of Fullerene-Like $MoS_2$", *J. Am. Chem. Soc.*, vol. 118, pp. 7804-7808 (1996).

Rosenfeld Hacohen et al., "Cage Structures and Nanotubes of $NiCl_2$", *Nature*, vol. 395, pp. 336-337 (Sep. 24, 1998).

Prasad et al., "Super Slippery Solids", *Nature*, vol. 387, p. 761 (Jun. 19, 1997).

Rapoport et al., "Inroganic Fullrene-Like Material As Additives to Lubricants: Strucutre-Function Relationship", *Wear*, 225-229, pp. 975-982 (1999).

Rothschild et al., "Growth of $WS_2$ Nanotubes Phases", *J. Am. Chem. Soc.*, vol. 122, pp. 5169-5179 (2000).

Y. Feldman et al., "Bulk Synthesis of Inorganic Fullerence-Like $MS_2$ (M=Mo, W) from the Respective Trioxides and the Reaction Mechanism", *J. Am. Chem. Soc.*, vol. 118, pp. 5362-5367 (1996).

Tenne et al., "Polyhedral and Cylindrical Structure of Tungsten Disulphide", *Nature*, vol. 360, pp. 444-445 (Dec. 3, 1992).

Margulis et al., "Nested Fullerene-Like Structures", *Nature*, vol. 365, pp. 113-114 (Sep. 9, 1993).

Rapoport, L et al., "Hollow Nanoparticles of WS2 as Potential Solid-state Lubricants", Nature, 387:791-793 (1997).

Tenne, R. et al., "Fullerene-Like Nanocrystals of Tungsten Disulfide", Advanced MAterials, 5:386-388 (1993).

* cited by examiner

REACTORS FOR PRODUCING INORGANIC FULLERENE-LIKE TUNGSTEN DISULFIDE HOLLOW NANOPARTICLES AND NANOTUBES

FIELD OF THE INVENTION

This invention is generally in the field of production of inorganic fullerene-like nanoparticles (IF) and nanotubes. More particularly it relates to reactors for production of tungsten disulfide hollow onion-like nanoparticles and nanotubes.

BACKGROUND OF THE INVENTION

Inorganic fullerene-like (IF) nanoparticles and nanotubes are attractive due to their unique crystallographic morphology and their interesting physical properties. In particular, disulfides of molybdenum and tungsten belong to a class of solid lubricants useful in vacuum, space and other applications where liquids are impractical to use. The fullerene-like nanoparticles can be used as superior solid lubricants, e. g. as additives to fluids and for self-lubrication.

$MS_2$ (M=Mo, W) layered compounds can be synthesized by sulfidization of the respective trioxides in a reducing atmosphere at elevated temperatures. Hollow $MoS_2$ and $WS_2$ onion-like (inorganic fullerene-like, IF) nanoparticles were first observed in thin (~20nm) films, which were formed by sulfidization of the respective amorphous $MO_3$ films in a reducing atmosphere at temperatures of about 850° C. (Tenne, R., Margulis, L., Genut, M., and Hodes, G., *Nature* 360, 444 (1992); Margulis, L., Salitra, G., Tenne, R., and Talianker, M., *Nature* 365, 113 (1993)). In a search for the synthesis of a pure IF phase, it was suggested to take oxide powder rather than a thin film as a precursor material. However, $MoO_3$ powder evaporates at temperatures above 700° C., while $WO_3$ does not sublime 1400° C. Therefore, at the relevant reaction temperatures (~850° C.), the reduction/sulfidization reactions of $MoO_3$ and $WO_3$ powders occur by the gas-phase reactions (GPR) and solid-gas reactions (SGR), respectively.

In the case of the GPR, the size and shape of the final reaction product depends only on the prevalent conditions in the reactor, since $MoO_3$ evaporates as $(MoO_3)_{3-5}$ molecular clusters (Magneli, A., *J. Inorg. Nucl. Chem.* 2, 330 (1956)). The reactor, which was used in an earlier report by some of the inventors of the present invention, (Feldman, Y, Wasserman, E., Srolovitz, D. J., and Tenne, R., *Science* 267, 222 (1995)) was very simple, indeed. A mixture of the three gases ($N_2$, $H_2$, $H_2S$) was made to flow through the $MoO_3$ vapor zone. IF-$MoS_2$ powder accrued on the reactor walls along with a large number of other oxide and sulfide phases obtained by the GPR, when the $MoO_3$ powder with crystallites of ~5 μm was used as a precursor. To regulate the GPR process and increase the production yield of IF-$MoS_2$, it was decided to separate the sublimation of $MoO_3$ powder from its sulfidization reaction. Several modifications of the reactor enabled the preparation a few milligrams of an almost pure IF phase in a single run (Feldman, Y, Wasserman, E., Srolovitz, D. J., and Tenne, R., Science 267, 222 (1995)). By varying the annealing time, the intermediate products of the reaction could be identified.

It should be understood that, according to the known mechanism for the growth of the IF phase in molybdenum or tungsten systems, the analysis of the kinetics of the simultaneous reduction and sulfidization of $WO_3$ powders are based on the occurrence of a unique driving force for the fast growth of the first curved sulfide layer (0001) around an oxide nanoparticle. According to that kinetic model, a synergy between the reduction and sulfidization processes, which occurs in a very narrow window of parameters, leads to the formation of the first closed sulfide layers (Feldman, Y, Lyakhovitskaya, V., and Tenne, R., *J. Am. Chem. Soc.* 120, 4176 (1998)). On the basis of this model, the inventors have estimated the temperature regimes for the formation of small (10-30 nm) or large (100-200 nm) IF of $WS_2$, $WSe_2$, and $WTe_2$ material, and experimental results have shown a good agreement with the predictions of the "synergy" model [Feldman, Y., Lyakhovitskaya, V., and Tenne, R., *J. Am. Chem. Soc.* 120, 4176 (1998); Tenne, R., Homyonfer, M, and Feldman, Y., *Adv. in Metal and Semiconductor clusters,* Ed M. A. Duncan, JAI Press Inc. 4, 227 (1997)]. The general principles of the sulfidization of the respective oxides, of the growth model were successfully applied also to the growth of IF in other layered systems, like $VS_2$, $In_2S_3$, and $SnS_2$ [Tsirlina, T., Feldman, Y, Homyonfer, M., Sloan, J., Hutchison, J. L., and Tenne, R., *Fullerene Science & Technology* 6, 157 (1998); Homyonfer, M., Alperson, B., Rosenberg, Yu., Sapir, L., Cohen, S. R., Hodes, G., and Tenne, R., *J. Am. Chem. Soc.* 119, 2693 (1997)].

It is necessary to point out here that the method of IF (including the nanotubes) formation is a "chemical" one: i.e., a chemical reaction is essential for the grow of these nanoparticles. Following this early work by the inventors of the present invention, a few reports on the synthesis of $MoS_2$ nano and microtubes by other "chemical" methods have appeared in the literature, recently [Remskar, M., Skraba, Z., Cleton, F., Sanjines, R., and Levy, F., *Surf. Rev. Lett.* 5, 423 (1998); Remskar, M., Skraba, Z., Regula, M., Ballif, C., Sanjines, R., and Levy, F., *Adv. Mat* 10, 246 (1998); Vollath, D., and Szabo, D. V., *Mater. Lett.* 35, 236 (1998); Zelenski, M., and Dorhout, P. K., *J. Am. Chem. Soc.* 120, 734 (1998)].

It should be emphasized that the synthesis of carbon fullerenes using "physical" methods, implies curvature of very small atomic sheets followed by the annihilation of the dangling bonds of the peripheral atoms, a process, which is induced by a high rate of energy dissipation. It was shown recently that IF-$MoS_2$ could be obtained also by "physical" methods, such as e-beam irradiation (Jose-Yacaman, M., Lorez, H., Santiago, P., Galvan, D. H., Garzon, I. L., and Reyes, A., *Appl. Phys. Lett.* 69, 8, 1065 (1996), or laser ablation of regular $MoS_2$ powder (Parilla, P. A., Dillon, A. C., Jones, K. M., Riker, G., Schulz, D. L., Ginley, D. S., and Heben, M. J., *Nature* 397, 114 (1999), or by short electrical pulses from the tip of a scanning tunneling microscope through amorphous $MoS_3$ nanoparticles Homyonfer, M., Mastai Y., Hershfinkel, M., Volterra, V., Hutchison, J. L., and Tenne, R., *J. Am. Chem. Soc.* 118, 33, 7804 (1996). IF-$NiCl_2$, including nanotubes were recently observed after heating of $NiCl_2$ at 960° C. in a reducing atmosphere (Rosenfeld-Hacohen, Y., Grunbaum, E., Sloan, J., Hutchison, J. L., and Tenne, R., *Nature* 395, 336 (1998). However, the IF yield in these cases is very modest and can not be compared with the large amounts of the pure IF-$WS_2$ ($MoS_2$) phase obtained by "chemical" methods.

The first SGR reactor for the synthesis of macroscopic quantities of IF-$WS_2$ was constructed in 1996 based on the principles of the above indicated reaction mechanism. To increase the amount of the reactant (oxide) and expose its entire surface to the g, a bundle of quartz tubes was placed inside the main quartz tube (40 mm diameter) and the oxide powder was dispersed in them, very loosely. The reactor was introduced into a horizontal furnace and the powder was placed in a constant temperature region (~850° C.). A stream of $H_2$/$N_2$+$H_2S$ gases passed through every tube filled with the powder. It created rather equivalent conditions for the reaction of the entire oxide powder during SGR. Typically, about 0.4 gram of IF-WS$_2$ could be obtained in a single batch (3 hr), with a conversion yield of almost 100%.

The precursor (oxide) powder and the reaction products were analyzed by X-ray pox%der diffraction (XRD) and transmission electron microscopy (TEM). The inventors recall that the size and shape of the precursor tungsten oxide nanoparticles predetermine the IF-WS$_2$ dimensions in the SGR synthesis. The starting material for the synthesis of IF-WS$_2$ was a WO$_3$ powder (>99% pure), with almost spherical particles having sizes smaller than ca. 0.2 μm. Oxide powder having a larger particle size was converted mainly into 2H-WS$_2$ phase. Moreover, 2H-WS$_2$ platelets were predominantly obtained if the packing of the powder was too compact. This fact required a very thorough control of the IF quality after every batch.

It was hypothesized before, that the tribological properties of the IF nanoparticles are closely related to their structure [(Rapoport, L., Bilik, Yu., Feldman, Y., Homyonfer, M., Cohen, S. R., and Tenne, R., *Nature* 387, 791 (1997). See also, *Nature* 387, 761 (1997); and Rapoport L., Feldman, Y., Homyonfer, M., Cohen, H., Sloan, J., Hutchison, J. L., and Tenne, R., *Wear* 2229, 975 (1999)]. In general, spherical IF nanoparticles exhibited tribological properties superior to their 2H counterpart, while their performance rapidly deteriorated upon loss of spherical shape. Therefore, it is expected that the more spherical IF-WS$_2$ nanoparticles would perform very well as solid lubricants. In addition, the larger IF should be a better lubricant in the case of the friction of two matting metal surfaces having higher surface roughness.

SUMMARY OF INVENTION

There is accordingly a need in the art to facilitate and optimize the solid-gas chemical reactions, which would increase the amount of available inorganic fullerene-like nanostructures.

The present invention thus provides a new reactor, which allows for a scale-up of IF-WS$_2$ production including nested fullerene-like structures and WS$_2$ nanotubes by more than two orders of magnitude. The falling-bed reactor, and especially fluidized-bed-designed reactors, pave the way for almost ideal growth conditions for synthesizing IF from an oxide precursor. As a result, the produced IF nanoparticles have a more uniform spherical shape and can grow to a larger size (up to 5.0μm). Likewise, the produced of nanotubes have a uniform size distribution. It is expected that the relatively spherical IF-WS$_2$ nanoparticles, which are produced by the falling or the fluidized bed reactor, will exhibit superior tribological properties, than reported before.

Thus, according to one aspect of the present invention, there is provided an apparatus for the production of inorganic fullerene-like (IF) nanoparticles and nanotubes, the apparatus comprising a chemical reactor, and is associated with a feeding set up and with a temperature control means for controlling the temperature along the reaction path inside the reactor so as to maintain the temperature to be substantially constant, the chemical reactor comprising:

(i) a flow line for pudding a continuous flow of a mixture of a reacting metal oxide powder and an inert flow assisting gas from the feeding setup into the reaction path, which extends along the reaction path;

(ii) at least one inlet port for supplying reacting gases into the reaction path to flow therethrough along the reactionpath, an interaction between the reacting gases and said mixture resulting in the formation of the IF nanostructures and nanotubes during the flow of the interacting materials along the reaction path;

(iii) at least one outlet port for trapping reacting gases; and (iv) at least one gas-permeable collector located at the opposite end portion of the reactor for collecting the formed IF nanostructures or nanotubes.

The feeding set-up comprises a flexible portion by which it is connected to the flow line of the reactor. The feeding set-up comprises two flexibly inter-connected containers aligned along an axis of feeding the mixture, each container having a mesh at its bottom and being mounted on a vibration assembly, the lower one of the containers being connected to the flow line of the reactor. The reaction path may extend along a vertical axis of the reactor and thus the at least one collector is located at the bottom of the reaction path. The inlet port for supplying the reacting gases, whose flow is assisted by inert gas, is located upstream of the reaction path. In a preferred embodiment this inlet for supplying the reacting gases is located downstream of the reaction path, and the flow of the reacting gases towards and through the reaction path being assisted by an inert gas. The temperature along the reaction path should be constant and may vary from about 750° C. to about 850° C. The resulting nanoparticles may be IF-WS$_2$ nanoparticles or a combination of IF-WS$_2$ nanoparticles and WS$_2$ nanotubes.

According to yet another aspect of the invention there is provided a synthetic method of production of WS$_2$ fullerene-like nanoparticles and nanotubes said method comprising the steps of:

(i) providing a chemical reactor defining a reaction path with predetermined temperature conditions along the reaction path;

(ii) feeding into the chemical reactor a mixture of a reacting tungsten oxide powder and an inert gas with a predetermined feeding rate, and feeding reacting gases so as to provide a continuous flow of the mixture and the gases through the reaction path;

(iii) maintaining the predetermined temperature to be substantially constant, thereby providing a solid-gas reaction between the reacting gases and the tungsten oxide powder during the flow through the reaction path, resulting in the formation of WO$_{3-x}$ clusters coated by at least one layer of WS$_2$, and further exchange of oxides by sulfides in inner parts of the clusters, thereby causing formation of WS$_2$ nanostructures; and (iv) collecting the formed WS$_2$ nanostructures.

The feeding rate of the reacting tungsten oxide powder is selected in accordance with the dimensions of the chemical reactor, thereby obtaining the WS$_2$ nanostructures in the form of nanoparticles, or a combination of nanoparticles and nanotubes. The feeding rate ranges between about 3mg/mm to about 120mg/mm, the reacting gases being H$_2$ and H$_2$S, the concentration of the H$_2$ gas being from about 0.2 % (w/v) to about 7 % (w/v) and the concentration of the H$_2$S gas being from about 0.1 % (w/v) to about 6 % (w/v). By predetermining the appropriate feed rate and appropriate concentration, either IF-WS$_2$ nanoparticles may exclusively be obtained or a combination of WS$_2$ nanotubes and IF-WS$_2$ nanoparticles may be obtained. The resulting nanoparticles each have a substantially perfect spherical shape with a size of up to 0.5 μm. The resulting nanotubes which may be obtained each have a length of up to a few hundreds µm and a cross-sectional dimension of up to 200 nanometer.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF A PREFERRED EMBODIMENT

The present invention deals with a method for the optimized production of inorganic fullerene-like nanoparticles and nanotubes. The synthetic route is a solid-gas reaction and two reactors (falling bed reactor and fluidized bed reactor) are utilized for the production of either the nanoparticles or the nanotubes.

The chemical reaction that occurs in the reactors of the present invention leading to the formation of the nanoparticles and nanotubes is the following. The metal oxide, $WO_3$, nanoparticles as agglomerates are derived downwards from a feeding set-up with the aid of a $N_2$ stream. The descending $WO_3$ agglomerates interact with a mixture of $H_2$ and $H_2S$ gases. The $H_2$, being lighter, diffuses faster than the $H_2S$ and interacts initially with the descending $WO_3$, partially reducing the agglomerates. Concurrently, the $WO_3$ interacts with the $H_2S$ stream; thus the overall interaction of the $WO_3$ agglomerates with the $H_2$ and $H_2S$ gases results in the formation of a completely closed monomolecular $WS_2$ layer around each nanoparticle. The formation of the first closed atomic layer of $WS_2$ on the surface of the metal oxide nanoparticle occurs during the short time interval between the beginning of the descending of the $WO_3$ agglomerates onto the top of the reactor (which process is $N_2$ assisted) and until the so-produced $WS_2$ coated $WO_{3-x}$ nanoparticles land on the filter (in the case of the falling bed reactor). This primary step is essential for the success of the IF synthesis, since it passivates the nanoparticles surface and prohibits coalescence of the nanoparticles, once they land on the bottom of the reactor. In the case of a fluidized bed reactor, no agglomeration of the oxide clusters could occur, since the nanoparticles are fluidized in the gas atmosphere during the entire reaction time.

During the creation of a completely closed monomolecular $WS_2$ layer (several seconds), a rather fast reduction of the oxide core by hydrogen occurs together with a fast deintercalation of oxygen and formation of crystal shears, i.e. rows of edge sharing octahedra. In the next step a slow intercalation of sulfur and its diffusion to the growth front occurs, the $WO_3$ being thus converted into tungsten sulfide. The latter process may last 30-300 min depending on the nanoparticle's size and the reaction temperature. In the case of nanoparticles smaller than 100 nm, this later process may last 60-120 min. The use of relatively large oxide particles (about 0.5 µm), in which sulfur intercalation is rather slow, necessitates an addition of an extra annealing step at 950° C. (5 hr) at the end of the present process, in order to complete the conversion of the oxide core into tungsten sulfide.

Consequently, the size of the IF-$WS_2$ particle is determined by the size of the incipient $WO_3$ nanoparticle. Furthermore, the geometry of the resulting IF-$WS_2$ nanoparticles is determined by the geometry of the $WO_3$ particles undergoing the reduction, initial interaction with $H_2S$, and further diffusion of sulfur atoms replacing the oxygen atoms. It is important to note that each IF-$WS_2$ nanoparticle has a single growth front of the sulfide, and therefore each nanoparticle is a single crystallite.

It is thus apparent that the mechanism of formation of the $WS_2$ nanotubes is slightly different, since the initial geometry of the reacting $WO_3$ particle should already reflect its final structure. In the formation of the IF-$WS_2$ nanotubes, the initial $WO_3$ particles interact under the terms that exist in the reactor with the slight humidity present, which is produced in-situ by the reduction of the metal oxide nanoparticles with $H_2$ present, leading to the formation of $WO_{3-x}(H_2O)_y$ particles. These particles sublimize and condense to form $W_5O_{14}$ nanoparticles which are in the form of whiskers (needles). These formed whiskers then undergo the partial reduction with $H_2$ gas and the further interaction with the $H_2S$ gas to form a core of $W_{18}O_{49}$ covered completely with a first layer of sulfide (A. Rothschild, J. Sloan, and R. Tenne, J. Am. Chem. Soc. 122, 5169 (2000)). The next step is exactly as the one happening in the formation of IF-$WS_2$ nanoparticles, i.e. a slow diffusion-controlled reaction of converting the inner oxide into sulfide layers.

It should be understood that the growth mechanism of IF-$WS_2$ was elucidated in quite a detail manner [the above-mentioned articles: Feldman, Y, Frey, G. L., Homyonfer, M., Lyakhovitskaya, V., Margulis, L., Cohen, H., Hodes, G., Hutchison, J. L., and Tenne, R. J. Am. Chem. Soc. 118, 5362 (1996); Feldman, Y., Lyakhovitskaya, V., and Tenne, R., J. Am. Chem. Soc. 120, 4176 (1998)], and therefore should not be described here in details. It was found that, under certain conditions, the simultaneous reduction and sulfidization of oxide nanoparticles lead to IF-$WS_2$ formation.

However, it appears that, if some process parameters are changed and either of the above two processes prevails, no fullerene-like particles will be synthesized. In particular, a deviation of the hydrogen/sulfur concentration ratio from the specified value at any point of the reaction chamber will most likely lead to 2H-$WS_2$ platelets formation there. Therefore, it is very important, especially at the fist instant of the reaction, that a homogeneous mixture of the three gases would engulf each oxide nanoparticle. The falling bed and fluidized reactors of the present invention are most suited and are optimized such as to ensure that all required conditions, are achieved and are maintained throughout the reaction.

Figure 1:
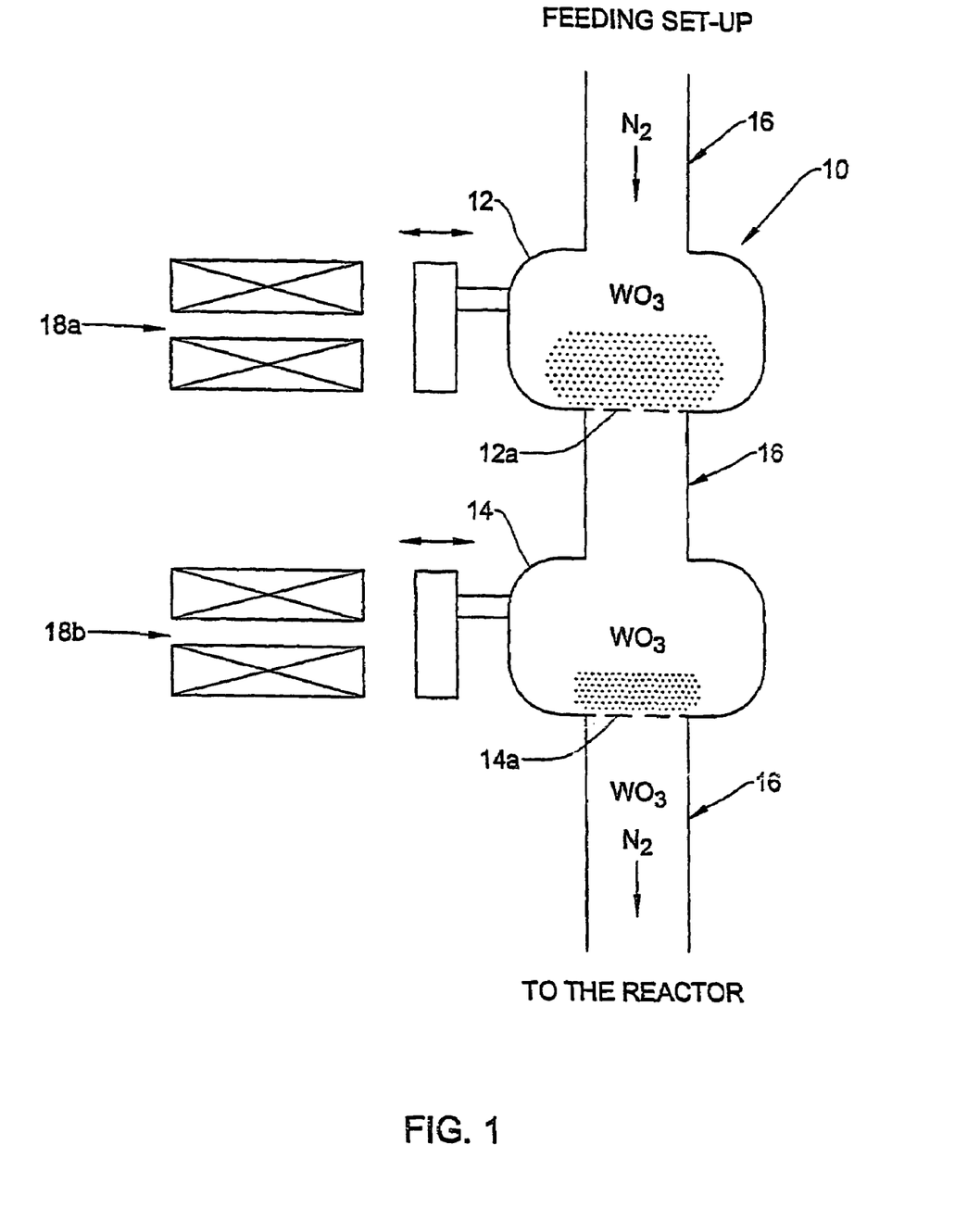
FIG. 1 is a two-stage vibro-electromagnet feeding set-up suitable for use in an apparatus according to the invention.

FIG. 1 illustrates a feeding set-up 10 suitable for use in the apparatus of the present invention. The set-up 10 is a vibro-electromagnet set-up constructed for feeding the $WO_3$ powder into a quartz tube based reactor in two stages, in a predetermined rate. The set-up consists of two glass beakers 12 and 14 with a mesh at their bottom, 12a and 14a, respectively, which are placed one on top of the other. The upper beaker 12 provides a coarse portion of $WO_3$ powder to the lower beaker 14, which then feeds the oxide powder into the reactor in fine steps. For that to occur, the bottom of the upper beaker 12 was joined to the entrance of the lower glass beaker 14 by a flexible rubber balloon 16. A similar flexible balloon connects the bottom of the lower glass beaker 14 to the top entrance of the reactor (not shown here). The soft balloons 16 serve also to damp the mechanical vibrations between the two beakers, and between them and the reactor. Each glass beaker is mounted on an electromagnet 18a and 18b (constituting a vibrating assembly), which shakes the respective glass beaker in a fully controllable rate. As shown, nitrogen gas is flushed through the feeding glass beakers continuously from up side down and assists the lowering of the oxide powder.

The shaking of the two glass beakers lead to dropping of a weighted amount of the $WO_3$ powder through the meshes at the bottom of each beaker, 12a and 14a, respectively. The rate of shaking of the higher electromagnet is inferior to the of the lower one. However, since the higher beaker 12 has a larger mesh-size 12a in its bottom, it can deliver, as a result of a single shake, a relatively large amount of material to the lower beaker 14. The lower beaker, in its turn, is able to deliver a much smaller portion of material at each shake, due to the fine mesh size in its bottom 14a. Typically, the rate of shaking of the upper beaker 12 is 1 pulse/min, while the rate of shaking of the lower beaker 14 is 15 pulse/min. However, while the upper beaker 12 may deliver 30 mg per pulse, the lower beaker 14 may deliver only 2 mg per pulse.

This vibro-electromagnet set-up 10 secures a continuous flux of even very small amount of metal oxide powder (from about 0.2 g/hr) to the reactor. The setup enables the metal oxide powder to go from the upper glass beaker 12 to the reactor without contacting the atmosphere. The feeding rate of the oxide powder is computer controlled and could be varied in the range from about 3 mg/min to about 120 mg/min. Careful selection of the feeding parameters (mesh-size, vibration rate and amplitude, rate of gas flow, etc.), are mandatory in order to avoid the accumulation of the metal oxide powder in one of the stages and provide the reactor with a continuous yet small flux of metal oxide precursor.

Figure 2A:
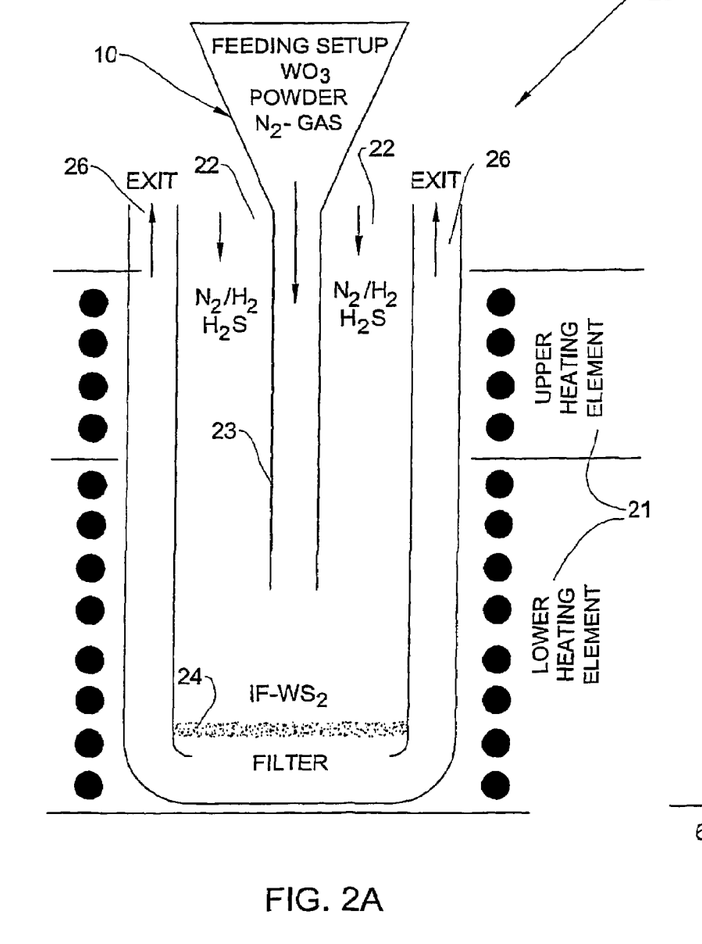
FIGS. 2A and 2B illustrate, respectively, a schematic representation of a falling bed reactor including the set-up of FIG. 1, and the temperature profile along the vertical axis of the reactor.

FIG. 2A illustrates a falling bed apparatus 20, according to the invention, for synthesizing the IF nanoparticles and nanotubes. The apparatus 20 is in the form of a quartz tube reactor (40 mm diameter), which is placed inside a vertical furnace 21 (constituting a temperature control means). The furnace is designed and operated so as to define two heating zones for the purposes of the present invention. It should, however, be noted, that the present invention is not limited to the use of two heating zones, and this particular furnace is constructed with two heating zones in order to maintain the temperature inside the reactor constant. Any setting that would keep the temperature constant is possible.

Placed at the top of the apparatus (reactor) 20 is the vibro-electromagnet 10 set-up for cofeeding the $WO_3$ powder with the aid of $N_2$ into the reactor. The reactor 20 is formed with an annular inlet opening 22 for supplying a mixture of reacting gases, $H_2S$ and $H_2$, the flow of which towards the inside of the reactor is driven by $N_2$. A tube (flow line) 23 connects the feeding set-up 10 to the inside of the reactor 20, thereby providing a precursor of the metal oxide powder to the reactor. A gas-permeable filter (collector) 24 is mounted at the bottom portion of the reactor 20 for collecting the end product. The gases escaping through the filter 24 are trapped through an outlet opening 26.

The cofeeder delivers the $WO_3$ powder from the top into the vertical reactor 20, and the mixture ($WO_3$ powder and $N_2$) flows in the same direction. This technique enables to minimize the possibility of any physical contact between the oxide nanoparticles at the early stages of the reaction. Moreover, this method rendered the synthetic process quasi-continuous. Within the reactor, the dropping metal oxide powder intersects with a flow of $H_2S$ and $N_2/H_2$ gasses entering the reactor at the opening 22. The interaction leads to the formation of the nanoparticles of $WO_{3-x}$ covered with a first $WS_2$ layer, which are collected on the filter 24. In order to obtain IF-$WS_2$ nanoparticles, the feed of $WO_3$ should be in the range of from about 3 mg/min to about 40 mg/min. The total stream rate of the gasses is in the range of about 150 cc/min. The concentration of the $H_2S$ and $H_2$ stream is in the range of from about 3% to about 7% (v/w). The temperature should be kept constant throughout the entire reaction path (variation of $\pm 5°$ C.). The temperature in the reaction path may however be in the range from about 750° C. to about 850° C. depending on the particle size of the metal oxide ($WO_3$) precursor. The pressure in the reactor is in the range of about 1.1 atm. The pressure is determined by the traps located next to the exit 26.

Figure 2B:
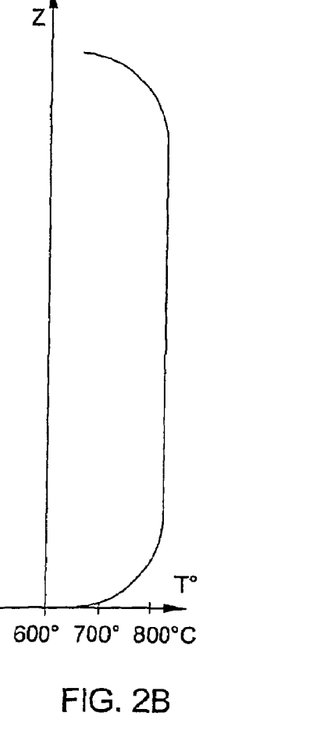

The temperature profile along the reaction path (z-axis) inside the reactor is illustrated in FIG. 2B. It is evident that the temperature during the various process stages is maintained constant. It should be noted that precise control of the reaction parameters is indispensable for the complete conversion of the tungsten oxide powder into IF tungsten sulfide nanoparticles. Radial and axial deviations of the temperature along the reaction path do not exceed ±5 degrees. Such variations in temperature are allowable by IF-$WS_2$ synthesis.

Under the above experimental parameters, $WS_2$ nanotubes are obtained as a mixture together with IF-$WS_2$ nanoparticles in case the feed of $WO_3$ is increased by 3 to 5, i.e. in the range of from about 40 mg/min to about 120 mg/min. On the other hand, such a mixture of nanotubes together with IF-$WS_2$ nanoparticles may be obtained with a feed rate in the range of from about 3 mg/min to about 40 mg/min. However, in such a case the other parameters have to be altered. Thus, in order to obtain $WS_2$ nanotubes, the concentration of the $H_2$ stream should be in the range of from about 0.2% to about 4% (v/w). The $H_2S$ concentration should be in the range of from about 0.2% to about 4%. The change in the experimental parameters leading to the formation of nanotubes affects the clusters undergoing the reduction and the interaction with $H_2S$.

Figure 2C:
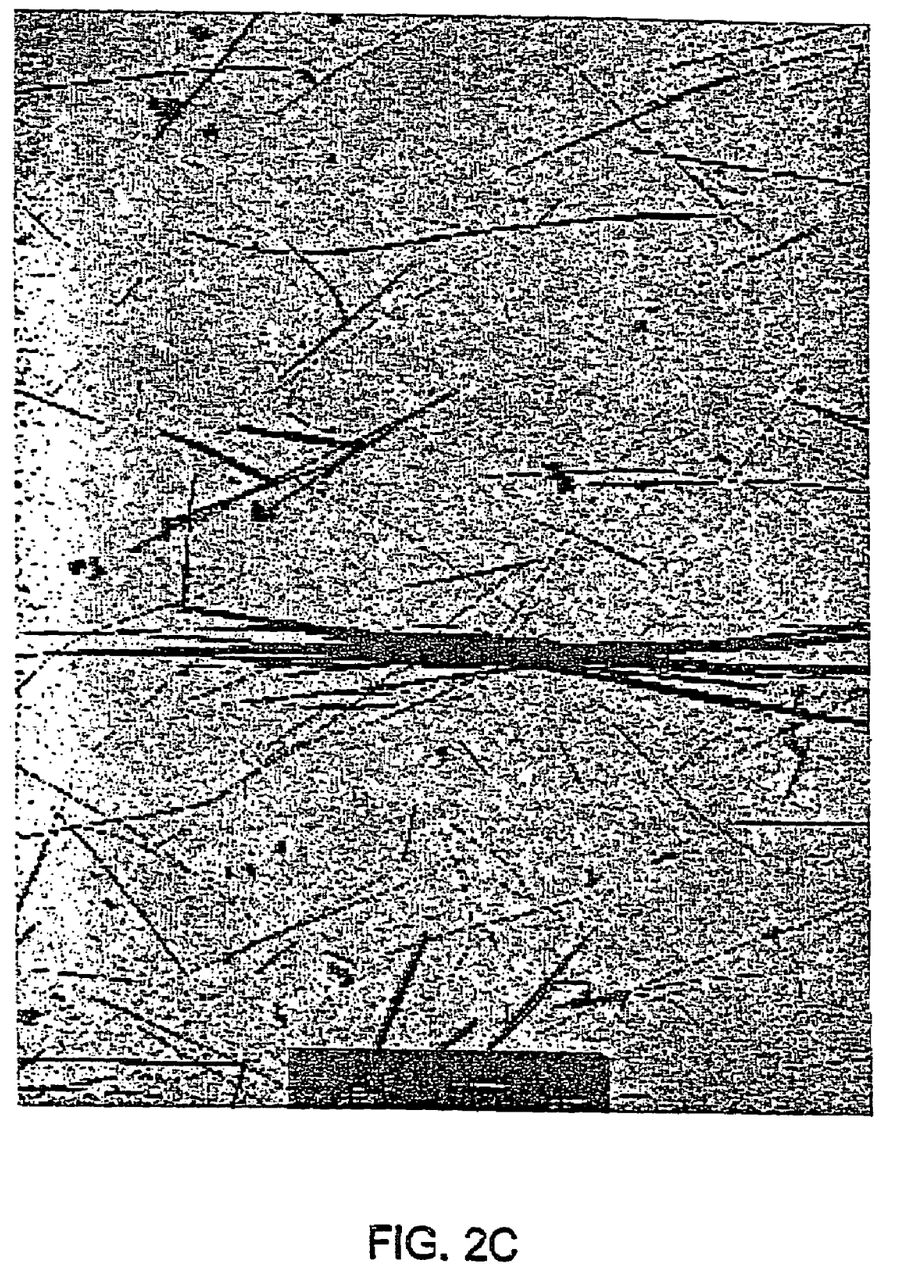
FIG. 2C illustrates a typical TEM image of $W_5O_{14}$ whiskers produced in the reactor according to the invention and serving as precursors for the production of $WS_2$ nanotubes.

As a result of this effect, $W_5O_{14}$ nanoparticles (or other $WO_{3-x}$ phases) are created being in the form of whiskers. FIG. 2C shows a TEM image of the $W_5O_{14}$ whiskers which serve as the precursor powder, formed in-situ, for obtaining the nanotubes. As indicated above, although not specifically shown, these formed whiskers then undergo the partial reduction wit $H_2$ gas and an interaction with the $H_2S$ gas to form a core of $W_{18}O_{49}$ covered completely with a first layer of sulfide.

Thus, the resulting powder, nanoparticles or nanotubes are collected on the filter 24, which is placed at the end of the constant temperature path (830° C. according to the present experimental parameters), and further react with $H_2S$ in order to obtain fully sulfidated nanostructures.

Obviously, since the process is quasi-continuous, the amount of IF increases with time during the synthesis. However, when the amount of IF per batch exceeds 15 grams, the quality of IF nanoparticles deteriorates. It was found by the inventors that, if the thickness of the powder on the filter 24 is too large, rather big clotted lumps start to appear, and, as a result, 2H-$WS_2$ platelets are formed. This can be overcome by the use of a fluidized bed reactor based apparatus.

Figure 3A:
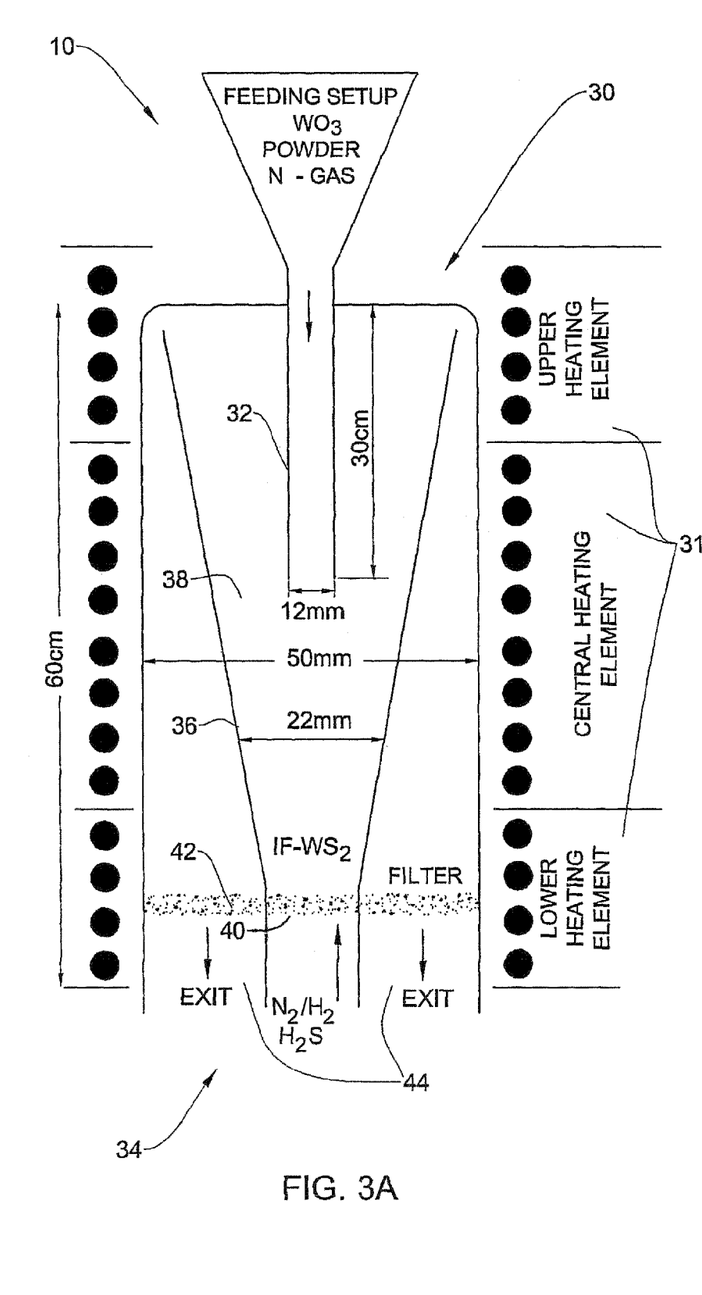
FIGS. 3A and 3B illustrate, respectively a schematic representation of a fluidized bed reactor including the set-up of FIG. 1, and the temperature profile along the vertical axis thereof.

FIG. 3A illustrates such a fluidized bed apparatus 30 for the IF synthesis utilizing the feeding set-up 10 for feeding the oxide powder towards the inside of the apparatus. The apparatus 30 is a quartz tube reactor installed in a furnace 31. Here, three heating zones are used, aligned along the vertical axis of the reactor. The use of three heating zones is by no means limiting, and, generally, any setting that would keep the temperature constant along the reaction path is possible. A long quartz tube 32 and a middle tube 36 are provided. The tube 32 connects the feeding set-up 10 to the interior of the reactor inside the tube 36, and extends through the upper heating zone and down to the reaction zone inside the tube 36. As shown, the tube 36 is conical-shaped having its wide part 38. A stream of reacting gases, $H_2$ and $H_2S$, is provided through an inlet opening 34 formed at the bottom of the reactor. Further provide in the reactor 30 is a gas-permeable filter 40 placed inside the tube 36 at the end of the constant temperature region (830° C. according to the present experimental conditions), and an additional gas-permeable filter 42 outside the tube 36, both for collecting a small part of powder propagating towards the filters. Gases escaping through filter 42 are discharged through an outlet opening 44.

In the present example, the quartz tube has a length of 60 cm and a diameter of 50 mm. The flow of the oxide powder $WO_3$, assisted by nitrogen gas flow (about 60 cc/min), passes through the 12 mm diameter and quartz tube 32, which may be from about 15 cm to about 30 cm long (30 cm according to the present reactor) within the reactor. The stream of the reacting gases, $H_2$ and $H_2S$ enters the reactor from the bottom opening 34 and flows upwards in a conical-shaped inner quartz tube through the middle part 36 having a diameter of about 22 mm towards its wider portion 38. The rate of the stream of the gas $H_2S$ and $N_2/H_2$ is from about 100 cc/min to about 200 cc/min. Therefore, the linear gas flow rate in the wide part 38 of the tube is approximately from about 10 cm/min to about 30 cm/min, which is about ten times slower than that in the narrow part of the tube 36. The flow of the mixture of $N_2$ and the oxide powder $WO_3$ leaps out the tube 32, and interfuses with the flow of $H_2S$ and $N_2/H_2$ gases in the wide part 38 of the conical-shaped tube. The reduction and sulfidization of the $WO_3$ particles starts as a result of the interfusion. The interfusion, based on the rates of the two opposite flows, may take place only in the wide section 38 or may begin in the narrow quartz tube 32. The former option occurs when the diffusion of the $H_2$ into the tube 32 is hindered by the fast nitrogen stream (100 cm/min) mixed with the $WO_3$ powder, and leads to the formation of IF-$WS_2$ nanoparticles. The latter case occurs when there occurs some diffusion of $H_2$ into the tube 32 and leads to the formation of a mixture containing also nanotubes. The resulting powder falls slowly down through the wide part 38 of the tube against the upwardly directed gas stream, until the falling powder is lowered to the narrow part of the tube 36. High linear rate of the $N_2/H_2/H_2S$ stream in the narrow part of the tube 36 offers fluidized bed conditions for the falling powder. The filter 40 placed at the end of the constant temperature region at 830° C. collects a small part of the powder that dropped on the filter. A very small part of the powder may be swept by the main stream and may be collected on the additional filter 42 placed outside the tube (i.e., outside the reaction zone) at the end of the constant temperature region (which under the present conditions is at 830° C.) on the way of the gases exit. However, most of the powder is fluidized in the space above the filter 40 in the narrow part of the tube 36, and stays in the fluidized bed region. It should be understood that, once the gas flow from the bottom of the reactor is terminated, the powder fluidized above the filter also falls onto the filter to be thereby collected.

Figure 3B:
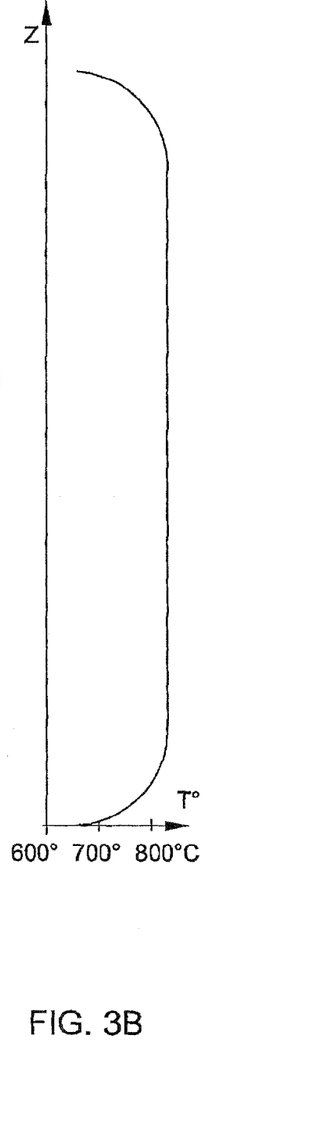

FIG. 3B illustrates the temperature profile along the reaction path (z-axis) inside the reactor 30, showing that the temperature during the various process stages is maintained constant.

In this way, more than about 100 grams of closed and hollow IF-$WS_2$ nanostructures could be synthesized in one batch (ca. 20 hr). Thus, the fluidized bed reactor 30 may serve as a prototype for the industrial production of IF-$WS_2$.

Figure 4:
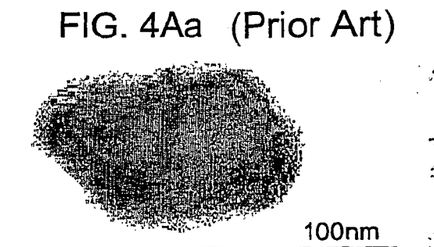
FIGS. 4A and 4B illustrate a TEM image of the prior art IF-$WS_2$ nanoparticles (FIG. 4Aa and FIG. 4Ba), and high magnification of two IF-$WS_2$ nanoparticles (FIGS. 4Ab-f and 4Bb)

FIG. 4A show TEM images of IF-$WS_2$ nanoparticles obtained by the prior art techniques (FIG. 4A(a)) and those obtained by the reactor 20 of the present invention (FIG. 4A(b-f)), wherein FIG. 4A(c,d,e) show the different projections of the same particle by tilting the sample (gride) at an angle of (0°±40°), and FIG. 4A(f) shows a rather large IF (about 400 nm). FIG. 4B shows the particles of the prior art technique (FIG. 4B(a) and of the invented techniques (FIG. 4B(b)) of FIG. 4A in an enlarged scale.

As evident, the shape of the IF particle of the present invention is very close to a sphere. The electron diffraction pattern of the 400 nm-IF particle of FIG. 4A(f), which is shown in the center of the picture, has also proved to be of a fullerene-like structure of the nanoparticle. The particles obtained by the present invention have more perfect spherical shape, than those obtained by the conventional synthetic tools. This stems from the fact that, according to the invention, the reaction takes place in the gas phase, where an isotropic environment for the reaction prevails. Consequently, much larger oxide nanoparticles could be converted into IF when they flow in the gas stream.

Figure 5:
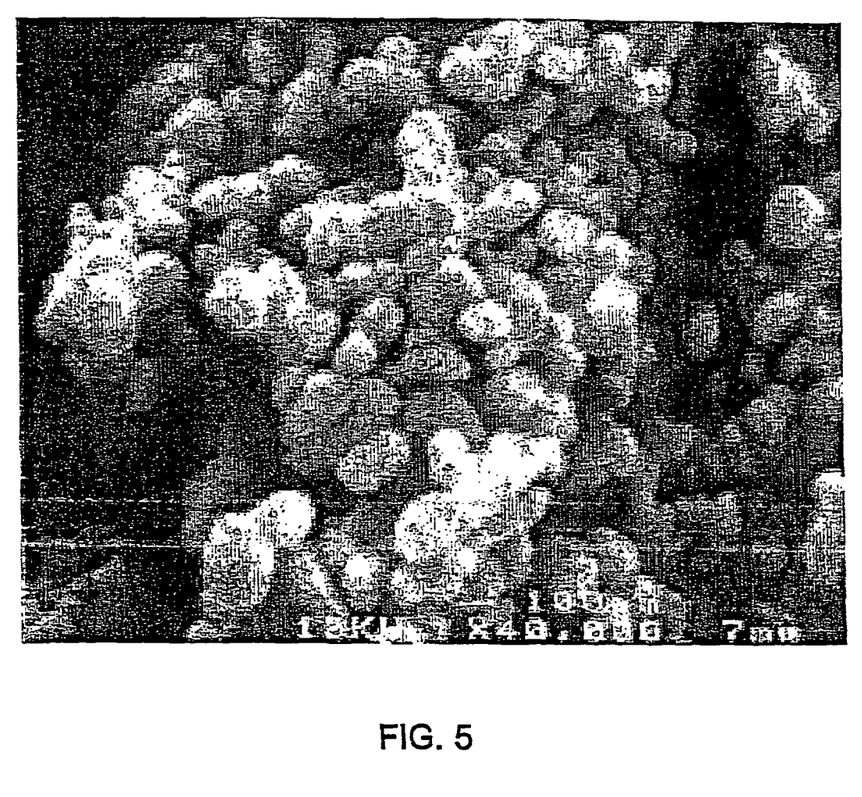
FIG. 5 is a SEM image of an ensemble of IF-$WS_2$ nanoparticles.

FIG. 5 illustrates the SEM image of the experimental results obtained with the falling bed reactor 20, showing spherical relatively large IF-$WS_2$ nanoparticles. The technique of the present invention enables to obtain IF particles with the size up to 0.5 µm, compared to 0.2 µm-particles obtained with the prior art reactor. Additionally, according to the invention, pure IF phase (with no extra contaminants) is obtained in these processes. Therefore, expensive and time-consuming filtration or purification processes are avoided.

Figure 6:
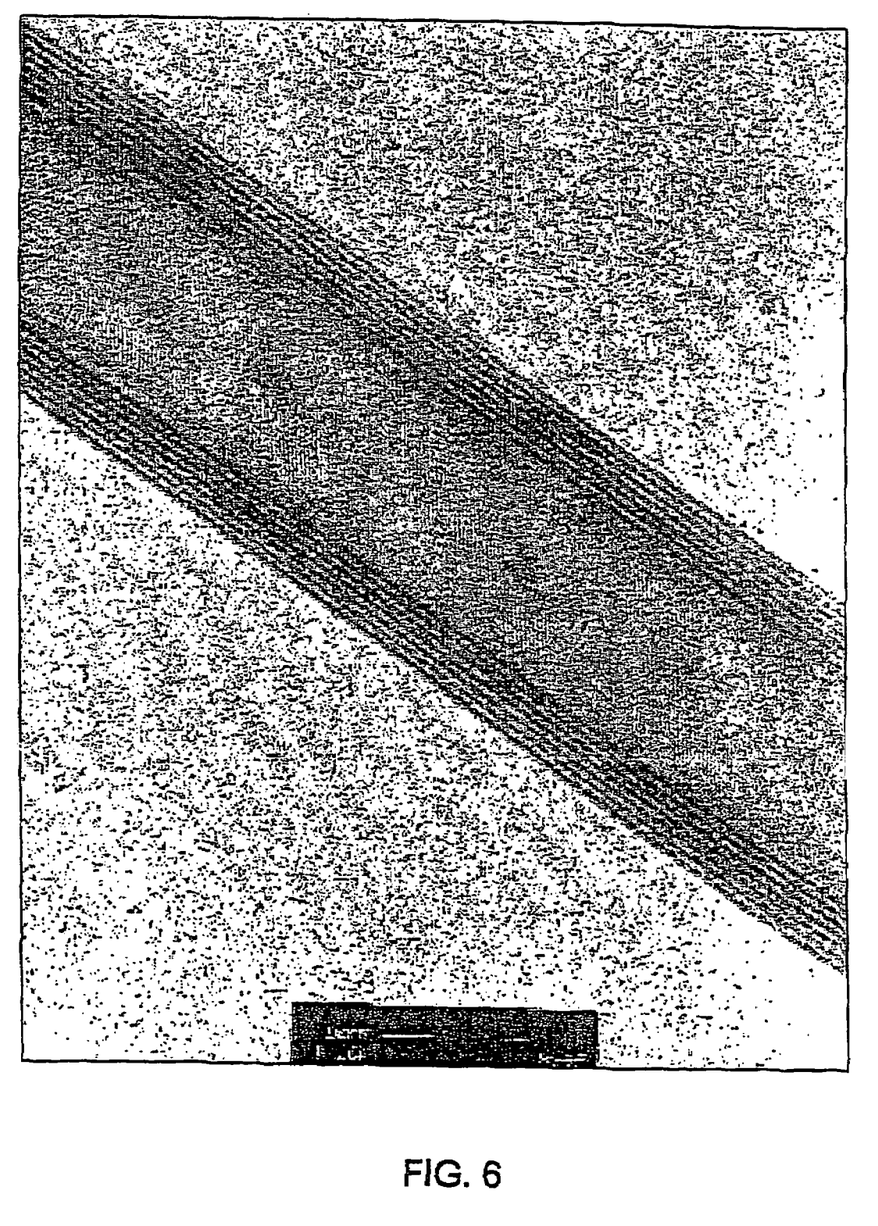
FIG. 6 illustrates a TEM image of IF-$WS_2$ nanotubes.

It should be understood that the above-described process of whiskers based nanotubes formation is relevant with respect to the reactor 30 as well. The resulting $WS_2$ nanotubes obtained by the two reactors 20 and 30 of the present invention have a maximum length of several hundreds µm and a cross-section of 200 nanometer. FIG. 6 illustrates the resulting nanotubes, showing a high resolution TEM image of the $WS_2$ nanotubes which are multilayer structure, the distance between each two adjacent layers being ca. 6.2 Å.

It should be understood that the use of the vertical posture of the furnace allows addition of the oxide powder into the reactor during the reaction, continuously. The maximum production yield per batch is about 20 grams of a pure IF-$WS_2$ phase by the falling bed reactor and is more than about 100 g of a pure IF-$WS_2$ phase by the fluidized bed reactor. It should also be understood that the fluidized bed concept lends itself for scale-up and to production of appreciably larger amounts of a pure IF-$WS_2$ phase.

An analysis of the stability of the nanoparticles and nanotubes formed by the present invention reveals that spontaneous transformation of IF-$WS_2$ to 2H has not been observed in any case. One would assume that as the size of the IF particles increases, the particles become closer (i.e., less bound) to the 2H particles in their structure. For example, the spacing between the two $WS_2$ layers (c/2) in the IF structures is larger than for the 2H particles. This lattice expansion diminishes with increasing size of the IF nanoparticles. It would thus be expected that the larger are the IF nanoparticles, the less is the stability of the IF to the 2H transformation. Another possible mechanism for the destruction of the formed IF nanoparticles under harsh environmental conditions is possible oxidation, which seems more likely than a transformation into 2H platelets. On the other hand, the increase of the IF-$WS_2$ nanoparticle size results in the increase of their oxidation temperature due to the reduced strain in the lattice. Therefore, practically the stability of the larger IF to oxidation must be higher.

As mentioned above, the tribological properties of the IF nanoparticles are closely related to their structure. In general, spherical IF nanoparticles exhibited tribological properties superior to their 2H counterpart, while their performance rapidly deteriorated upon loss of spherical shape. Therefore, the relatively spherical IF-$WS_2$ nanoparticles, which are produced by the falling (fluidized) bed reactor, perform very well as solid lubricants. In addition, the larger IF must be a better lubricant in the case of the friction of two mating metal surfaces having higher surface roughness. These hypotheses are substantiated by our recent tribological measurements. For example, it was found that addition of small amount of IF-$WS_2$ to a lubrication fluid leads to a significant improvement of the tribological properties as compared to regular $WS_2$ ($MoS_2$) powders in the same concentration and to a pure fluid lubricant.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

The invention claimed is:

1. A synthetic method of production of $WS_2$ fullerene-like nanoparticles and nanostructures from $WO_3$ metal oxide powder and $H_2$ and $H_2S$ reacting gases, said method comprising the steps of:
   (i) feeding a first mixture of a reacting tungsten oxide powder and an inert gas with a predetermined feeding rate downwardly into the top of a vertical flow line extending into the inside of a vertical chemical reactor such that a lower end of the vertical flow line is located inside the vertical chemical reactor, and providing a flow of a mixture of the $H_2$ and $H_2S$ reacting gases along said vertical chemical reactor, so as to allow interaction of the flowing tungsten oxide powder and the reacting gases in a reaction path located in the vertical chemical reactor;
   (ii) controlling temperature inside the chemical reactor so as to provide a predetermined temperature profile along the reaction path; and
   (iii) collecting the formed $WS_2$ nanostructures at a bottom portion of the vertical reactor,
   the method thereby providing a solid-gas reaction between the reacting gases and the tungsten oxide powder during the flow through and along the reaction path, resulting in the formation of $WO_{3-x}$ clusters coated by at least one layer of $WS_2$, and further exchange of oxides by sulfides in inner parts of the clusters, thereby causing formation of $WS_2$ nanostructures.

2. The method according to claim 1, wherein the feeding rate of the reacting tungsten oxide powder is selected in accordance with the dimensions of the chemical reactor, thereby obtaining the $WS_2$ nanostructures in the form of IF-nanoparticles, or a combination of IF-nanoparticles and nanotubes.

3. The method according to claim 2, wherein the feeding rate ranges between about 3 mg/min to about 120 mg/min, the concentration of the $H_2$ gas being from about 0.2% (w/v) to about 7% (w/v) and the concentration of the $H_2S$ gas being from about 0.1% (w/v) to about 6% (w/v).

4. The method according to claim 3, wherein the formed nanostructures contain a combination of nanoparticles and nanotubes.

5. The method according to claim 2, wherein the feeding rate ranges between about 3 mg/min to about 40 mg/min, with the concentration of the $H_2$ and $H_2S$ gases ranging from about 0.2% to about 4% (w/v).

6. The method according to claim 5, wherein the formed IF-$WS_2$ nanostructures contain nanoparticles, each having a substantially perfect spherical shape and having a size up to 0.5 μm.

7. The method according to claim 2, wherein the feeding rate ranges between about 40 mg/min and about 120 mg/min, with the concentration of the $H_2$ and $H_2S$ gases from about 3% to about 7% (w/v).

8. The method according to claim 7, wherein the formed $WS_2$ nanostructures contain a combination of IF-nanoparticles and nanotubes, the nanotubes each having a cross-sectional dimension of up to 200 nanometer.

9. The method according to claim 2, wherein the feeding rate ranges between about 3 mg/min to about 40 mg/min, with the concentration of the $H_2$ gas from about 0.2% to about 4% and the concentration of the $H_2S$ gas from about 0.2% to about 4% (w/v)

10. The method according to claim 9, wherein the formed $WS_2$ nanostructures contain a combination of nanoparticles and nanotubes, the nanotubes having a length of up to several hundred μm and a cross-sectional dimension of up to 200 nanometer.

11. The method according to claim 1, wherein said temperature within the reaction path is maintained at a constant temperature within the range of about 750° C. to about 850° C.

12. The method according to claim 1, wherein the flow of the mixture of the $H_2$ and $H_2S$ reacting gases in said feeding step (i) is in a downward direction into the top of the vertical chemical reactor.

13. The method according to claim 1, wherein the flow of the mixture of the $H_2$ and $H_2S$ reacting gases in said feeding step (i) is in an upward direction from the bottom of the vertical chemical reactor, thereby creating a fluidized bed of said powder in said reacting gases.

* * * * *